UNITED STATES PATENT OFFICE.

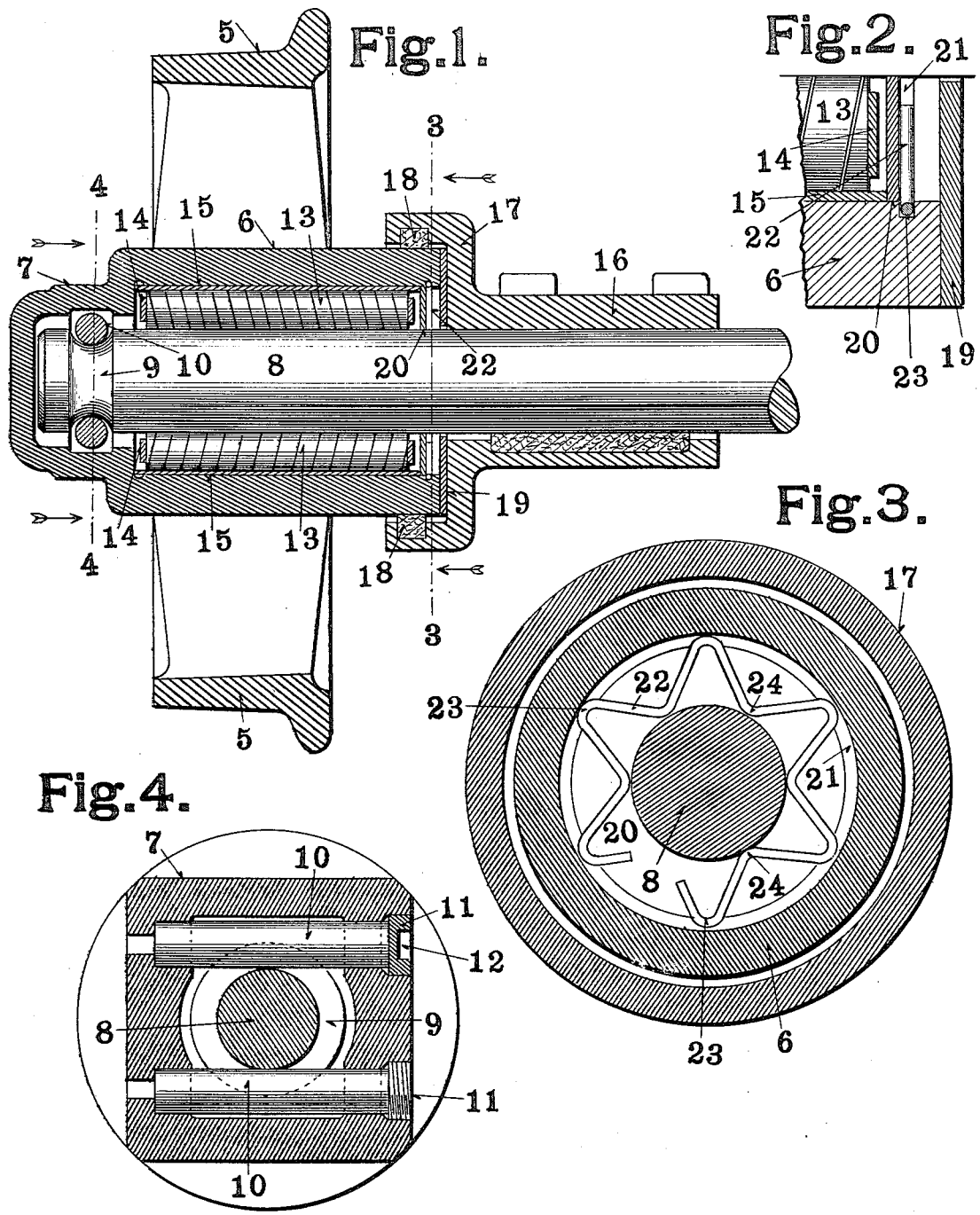

FRANK S. BARKS AND JOHN T. KRIEGER, OF ST. LOUIS, MISSOURI, ASSIGNORS TO LINCOLN STEEL & FORGE COMPANY, OF ST. LOUIS, MISSOURI, A CORPORATION OF MISSOURI.

BEARING FOR CAR-WHEELS.

1,282,365.

Specification of Letters Patent.

Patented Oct. 22, 1918.

Application filed January 5, 1918. Serial No. 210,426.

*To all whom it may concern:*

Be it known that we, FRANK S. BARKS and JOHN T. KRIEGER, citizens of the United States of America, residing at the city of St. Louis, State of Missouri, United States of America, have invented certain new and useful Bearings for Car-Wheels, of which the following is such a full, clear, and exact description as will enable any one skilled in the art to which it appertains to make and use the same, reference being had to the accompanying drawings, forming part of this specification.

Our invention relates to car wheels, and particularly to the type of wheels which rotate on the axles as in mine cars, trucks, and similar articles. Its object is the provision of important means for holding the antifriction bearing in position in the wheel, and forming a lubricating retaining chamber for the bearing.

In the accompanying drawings, which illustrate one form of mine car wheel made in accordance with our invention, Figure 1 is a longitudinal section; Fig. 2 is an enlarged detail view of some of the parts shown in Fig. 1; Fig. 3 is an enlarged section on the line 3—3 of Fig. 1; Fig. 4 is an enlarged section on the line 4—4 of Fig. 1.

Like marks of reference refer to similar parts in the several views of the drawings.

5 represents the rim of the car wheel, and 6 the hub. The hub 6 is preferably provided with a closed outer end 7. The axle 8 is provided near its outer end with an annular groove 9. Locking pins 10 are carried in the closed end of the hub 6 and coöperate with the groove 9 in the axle 8 to hold the wheel in place on the axle. The pins 10 are held in position by means of threaded plugs 11, preferably provided with rectangular openings 12 for the insertion of a suitable tool for screwing the said plugs into position and removing the same.

13 are anti-friction rolls, which may be of any suitable form and are arranged between the hub 6 and the axle 8. The rolls 13 are spaced and positioned by a suitable cage 14, and a lining sleeve 15 of steel or other suitable material is placed between the hub 6 and the rolls 13 to provide a bearing surface for the rolls. The axle 8 is carried in a bearing 16 attached to the frame of the car. The bearing 16 is provided with an enlarged portion 17, surrounding the inner end of the hub 6 and carrying a suitable washer 18 for preventing the entry of dust into the bearing. 19 is a washer placed between the part 17 and the end of the hub 6. In order to retain the rolls 13 and the lining 15 in position we provide a washer 20 which bears against the end of the said lining 15, and is provided with a central opening of the same diameter as the axle. This washer 20 is held in position by the retaining member 22 consisting of a sinuously bent spring wire engaging at its outer bends with an annular groove 21 in the hub. The inner bends 24 are preferably adapted to bear against the axle 8, so as to prevent the removal of the member 22 when the axle is in position. When the axle is removed the member 22 can be compressed to move the bends 23 out of engagement with the groove 21, and thus allow the removal of the washer and parts of the bearing.

It will be noted that the construction described forms a simple and positive bearing and oil retaining means, permitting easy and quick access to and removal of the bearing.

Having fully described our invention, what we claim as new and desire to secure by Letters Patent of the United States is:

1. The combination of a wheel hub, an axle, a bearing between the hub and axle, and a bearing retaining member provided with means coöperating with the axle to prevent removal of said member when the hub is in position on the axle.

2. The combination of a wheel hub, an axle, a bearing between said hub and axle, a washer for holding said bearing in place, and a resilient locking member for holding the washer.

3. The combination of a hub provided with a recess, an axle, a bearing between the hub and axle, and a bearing retaining member engaging with said recess and provided with means coöperating with the axle to prevent the removal of said member when the axle is in position in the hub.

4. The combination of a hub provided with an annular groove, an axle, a bearing between said hub and axle, and bearing retaining means comprising a sinuous resilient member adapted to be sprung into engagement with said groove.

5. The combination of a hub provided with an annular groove, an axle, a bearing between said hub and axle, and bearing retaining means comprising a sinuous annular member adapted to be sprung into engagement with said groove, the inner bends of said member being adapted to contact with the axle to prevent the removal of the retaining member while the axle is in position.

6. The combination with a wheel hub provided with an annular groove, a bearing sleeve in said hub, an anti-friction bearing between said sleeve and the axle, a washer engaging one end of said sleeve and forming a closure for the bearing chamber, and a resilient member adapted to be sprung into engagement with the groove in the hub to hold said washer and bearing in position.

In testimony whereof, we have hereunto set our hands and affixed our seals.

FRANK S. BARKS. [L. S.]
JOHN T. KRIEGER. [L. S.]